US008307275B2

(12) United States Patent  (10) Patent No.: US 8,307,275 B2
Clark et al.  (45) Date of Patent: Nov. 6, 2012

(54) DOCUMENT-BASED INFORMATION AND UNIFORM RESOURCE LOCATOR (URL) MANAGEMENT

(75) Inventors: Timothy Pressler Clark, Rochester, MN (US); Zachary Adam Garbow, Rochester, MN (US); Richard Michael Theis, Rochester, MN (US); Brian Paul Wallenfelt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1508 days.

(21) Appl. No.: 11/297,310

(22) Filed: Dec. 8, 2005

(65) Prior Publication Data

US 2007/0136318 A1  Jun. 14, 2007

(51) Int. Cl.
*G06F 17/00* (2006.01)
(52) U.S. Cl. ................................. 715/206; 707/E17.114
(58) Field of Classification Search .................... 715/206
See application file for complete search history.

(56) References Cited

U.S. PATENT DOCUMENTS

| | | | | |
|---|---|---|---|---|
| 5,973,692 A * | 10/1999 | Knowlton et al. | ............ | 715/835 |
| 6,049,799 A * | 4/2000 | Mangat et al. | .................. | 707/10 |
| 6,122,647 A * | 9/2000 | Horowitz et al. | ............. | 715/205 |
| 6,211,871 B1 * | 4/2001 | Himmel et al. | ............... | 715/744 |
| 6,397,219 B2 * | 5/2002 | Mills | .............................. | 707/10 |
| 6,925,594 B2 * | 8/2005 | Dutta et al. | .................... | 715/205 |
| 7,133,860 B2 * | 11/2006 | Iizuka et al. | ....................... | 707/2 |
| 7,194,469 B1 * | 3/2007 | Dowd et al. | ..................... | 707/10 |
| 7,213,198 B1 * | 5/2007 | Harik | .............................. | 715/234 |
| 7,275,066 B2 * | 9/2007 | Priestley | ................... | 707/103 R |
| 7,275,206 B1 * | 9/2007 | Bates et al. | .................... | 715/205 |
| 7,308,643 B1 * | 12/2007 | Zhu et al. | ...................... | 715/206 |
| 7,406,659 B2 * | 7/2008 | Klein et al. | .................... | 715/273 |
| 7,487,190 B2 * | 2/2009 | Black et al. | .......................... | 1/1 |
| 2001/0020238 A1 * | 9/2001 | Tsuda | ............... | 707/5 |
| 2001/0049700 A1 * | 12/2001 | Ichikura | ....................... | 707/512 |

(Continued)

FOREIGN PATENT DOCUMENTS

JP  2002259450 A  *  9/2002

OTHER PUBLICATIONS

Title: Advanced Search Page Chapter: 4 url: <http://highered.mcgraw-hill.com/sites/dl/free/0079876543/100723/chapter4.pdf>
Date: 2003.*

(Continued)

*Primary Examiner* — Laurie Ries
*Assistant Examiner* — Mustafa Amin
(74) *Attorney, Agent, or Firm* — James R. Nock

(57) ABSTRACT

The present invention enables users to dynamically manage historical data within documents bearing one or more links, and retain the relationships defined by the links. The present invention tracks the links not just from source documents to destination documents, but also from destination documents back to the source documents, organizes the links in a hierarchical manner based on the content/naming of the links, and displays the link information to the user in a real-time and meaningful way.

6 Claims, 8 Drawing Sheets

U.S. PATENT DOCUMENTS

| | | | |
|---|---|---|---|
| 2002/0116411 A1* | 8/2002 | Peters et al. | 707/501.1 |
| 2003/0101183 A1* | 5/2003 | Kabra et al. | 707/8 |
| 2003/0191737 A1* | 10/2003 | Steele et al. | 707/1 |
| 2003/0208482 A1* | 11/2003 | Kim et al. | 707/3 |
| 2004/0034635 A1* | 2/2004 | Czarnecki et al. | 707/7 |
| 2004/0068527 A1* | 4/2004 | Smith, III | 707/204 |
| 2004/0083424 A1* | 4/2004 | Kawai et al. | 715/501.1 |
| 2004/0177319 A1* | 9/2004 | Horn | 715/501.1 |
| 2004/0205496 A1* | 10/2004 | Dutta et al. | 715/501.1 |
| 2004/0205569 A1* | 10/2004 | McCarty et al. | 715/513 |
| 2004/0267739 A1* | 12/2004 | Dowling | 707/3 |
| 2005/0021862 A1* | 1/2005 | Schroeder et al. | 709/246 |
| 2005/0050032 A1* | 3/2005 | Lee | 707/3 |
| 2005/0086206 A1* | 4/2005 | Balasubramanian et al. | 707/3 |
| 2005/0114756 A1* | 5/2005 | Lehikoinen et al. | 715/501.1 |
| 2005/0120292 A1* | 6/2005 | Suzuki | 715/501.1 |
| 2005/0149519 A1* | 7/2005 | Abe | 707/5 |
| 2005/0198567 A1* | 9/2005 | Vermeulen et al. | 715/513 |
| 2005/0278475 A1* | 12/2005 | Karatal et al. | 711/100 |
| 2007/0022098 A1* | 1/2007 | Malik | 707/3 |
| 2007/0106721 A1* | 5/2007 | Schloter | 709/200 |
| 2007/0106956 A1* | 5/2007 | Platt et al. | 715/808 |
| 2011/0041099 A1* | 2/2011 | Weise et al. | 715/854 |

OTHER PUBLICATIONS

Title: OFM—The Open filemanager Date: 2003 url: <http://www.nongnu.org/ofm>.*

Title: WebTOC: A Tool to visualize and quantify web sites using a hierarchical table of contents browser Author: Daved A. Nation Date: 1997 url: <ftp.cs.umd.edu/pub/hcil/Demos/WebTOC/Paper/WebTOC.html>.*

Title: Extract URL v1.2, Date: Jun. 9, 2002, pp. 1-3, URL:<http://spadixbd.com/extacturl/index.htm>.*

Title: LinkPhantom, Date: 2008, p. 1-4, URL:<http://dmoz-extractor.com/linkphantom.htm>.*

Title: Link Suite 4, Date: 2008, pp. 1-5, URL:<http://dmoz-extractor.com/linkssuite.html>.*

Title: WebTOC: A Tool to visualize and quantify web sites using a hierarchical table of conents browser, Author: David A. Nation, Date: Apr. 1998, pp. 1-2, URL<http://delivery.acm.org/10.1145/290000/286664/p185-nation.pdf?ip=151.207.242.4&acc=ACTIVE%20SERVICE&CFID=101381366&CFTOKEN=61052813&_acm_=1344105239_2d03fba2d3676152739530aeecc17077>.*

"Advanced Google Search Operators," http://google.com/help/operators.html.

* cited by examiner

SPORTS.COM

LATEST SCORES

---- ----
---- ----
---- ----
---- ----
---- ----
---- ----

CURRENT HEADLINES

---- ----
---- ----
---- ----
---- ----
---- ----
---- ----

ARTICLES — 602

NY YANKEES ACQUIRE SMITH IN TRADE WITH RED SOX

Today, Red Sox outfielder Rex Smith in a trade with the Yankees for an undisclosed draft choice. Smith led the Yankees in strikeouts this year. Smith' has played with the Yankees for 3 years, the Yankees being his third major league team.

BLUES SIGN FORWARD
JOHNSON TO NEW DEAL

DOCUMENT-BASED INFORMATION AND UNIFORM RESOURCE LOCATOR (URL) MANAGEMENT

FIELD OF THE INVENTION

The present invention relates generally to document management, and more specifically to tracking and organizing links between historical documents.

BACKGROUND OF THE INVENTION

The development of the EDVAC computer of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

Every day, computer users are faced with the daunting task of managing and retrieving information from scores of e-mail messages, thousands of files on their personal computers and servers, and billions of Web pages. Managing this myriad of information from a multitude of sources is a difficult and time consuming task.

With the interconnected nature of our work today, many of these information sources are connected to each other and to other references via links. A prime example of such a link is the Uniform Resource Locator (URL). A URL provides the global address of documents and other resources on the World Wide Web. The first part of the address indicates what protocol to use, and the second part specifies the IP address or the domain name where the resource is located. Thus, URLs imply an important relationship between a source document and a destination document.

Currently, the only way to manage these relationships is through search algorithms/products such as Google™ Desktop Search or Google™ Pagerank. However, such solutions have an important shortcoming in that they only help to identify files after inputting one or more keywords. When results are received from such tools, it remains difficult to track which documents contain which links (URLs). Additionally, it is a challenge to remember where each link (URL) was referenced and to find its related documents. Manually organizing and saving all of the links (URLs) in a relevant presentation form is currently nearly impossible.

There is a need for a better technique to help users dynamically manage historical data within and between documents bearing one or more links, and retain the relationships defined by the links. The technique needs to track the links not just from source documents to destination documents, but from destination documents back to the source documents, organize the links in a hierarchical manner based on the content/naming of the links, and display the link information to the user in a real-time and meaningful way.

SUMMARY OF THE INVENTION

The present invention provides a method, apparatus and program product for managing historical data within and between documents bearing one or more links, and retaining the relationships defined by the links. The present invention tracks this information not just from source documents to destination documents, but also from the destination documents back to the source documents.

More specifically, the present invention provides a method for managing links within a plurality of documents. The method begins by opening a source document chosen from the plurality of documents, scans the source document for document links, and for each document link found, adds an entry to a link database indicating the name of the source document and the document link. In one embodiment, the method then scans the document pointed to by the document link for any relevant keywords, then if any are found, includes the relevant keywords in the link database via a keyword entry. The keyword entry includes the keyword itself, a source document name, and the document link of the document containing the relevant keyword. In one embodiment, the present invention then parses the source document for relevant keywords, searches for the keyword entries within the link database for any occurrences of the relevant keywords parsed from the source document, and creates a list of documents containing keywords matching the relevant keywords parsed from the source document. The user is then presented with a list of documents containing keywords matching the relevant keywords parsed from the source document (e.g., via a temporary bookmark folder or a split-screen view).

In another embodiment, the present invention searches the document link entries within the link database for any occurrences of the current source document, then creates a link of backward references for each entry found, which is then presented to the user (e.g., via a temporary bookmark folder or a split-screen view).

The source documents utilized by the present invention may take a number of forms, including, but not limited to, word processor documents, portable desktop format (PDF) files, e-mails, websites, instant messages and electronic notes.

The present invention may also organize the document links within a source document in a hierarchical manner based on the structure of the source document. In one embodiment, the present invention accomplishes this by creating a base bookmark folder, analyzes the structure of the source document in order to determine a logical grouping of the document links, creates link categories based on the logical grouping of documents links, parses the source document and link content for relevant keywords, and creating bookmark subfolders to the base bookmark folder based on the link subcategories, where the name for each bookmark subfolder is based up the relevant keywords.

BRIEF DESCRIPTION OF THE DRAWINGS

Various embodiments of the present invention are hereinafter described in conjunction with the appended drawings:

FIG. 6 illustrates an exemplary website upon which the present invention operates.

It is to be noted, however, that the appended drawings illustrate only an example embodiment of the invention, and are therefore not considered limiting of its scope, for the invention may admit to other equally effective embodiments.

DETAILED DESCRIPTION

Figure 1:
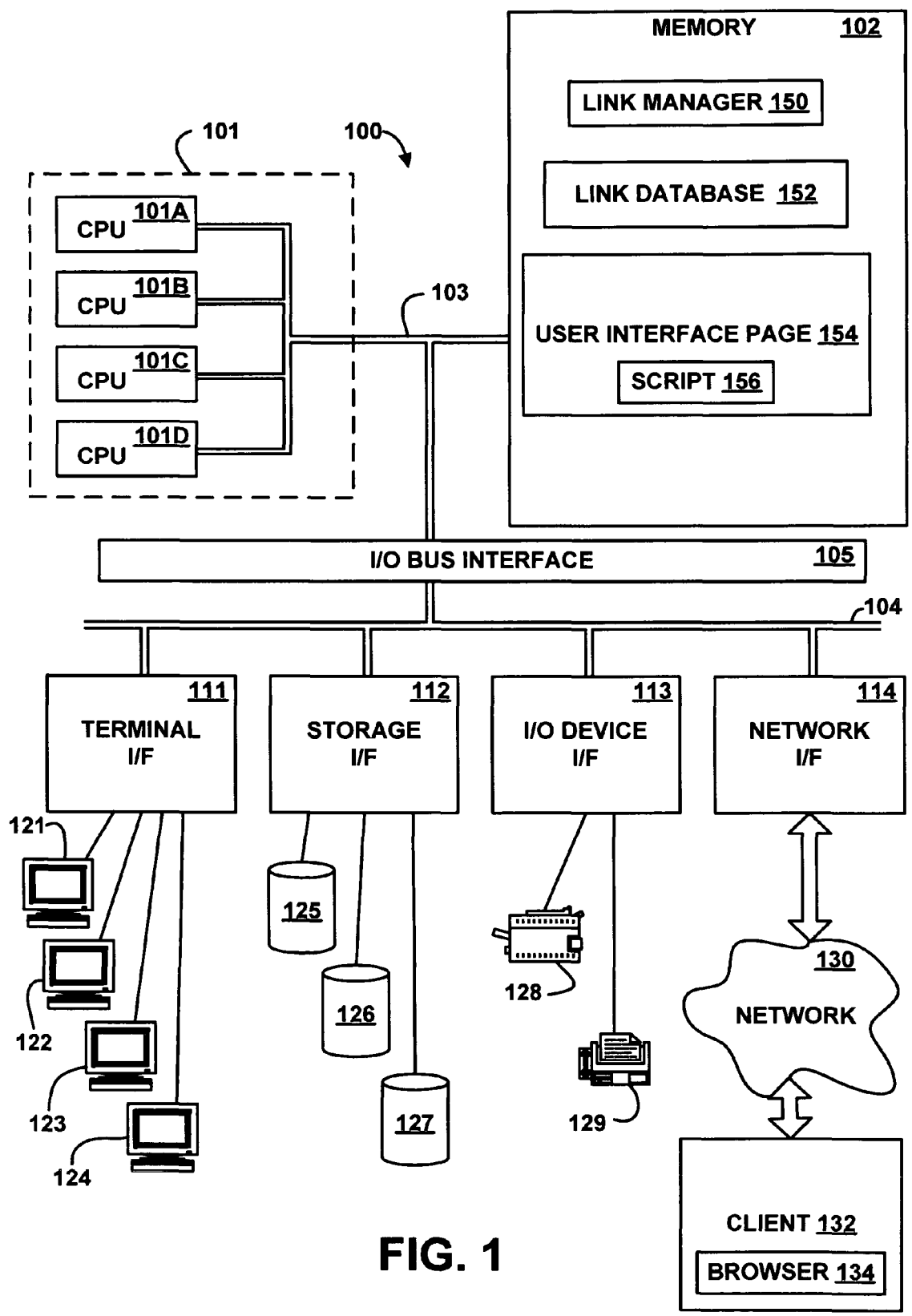
FIG. 1 depicts a high-level block diagram of an example system for implementing an embodiment of the invention.

Referring to the Drawing, wherein like numbers denote like parts throughout the several views, FIG. 1 depicts a high-level block diagram representation of a computer system 100 connected to a client 132 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more programmable central processing units (CPUs) 101A, 101B, 101C, and 101D, herein generically referred to as a processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-chip cache.

The main memory 102 is a memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes a link manager 150, a link database 152, and a user interface page 154. Although the link manager 150, link database 152, and user interface page 154 are illustrated as being contained within the memory 102 in the computer system 100, in other embodiments some or all of them may be on different computer systems (e.g., on client 132) and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the link manager 150, the link database 152, and the user interface page 154 are illustrated as being contained within the main memory 102, these elements are not necessarily all completely contained in the same storage device at the same time.

In an embodiment, the link manager 150 includes instructions capable of executing on the processor 101 or statements capable of being interpreted by instructions executing on the processor 101 to perform the functions as further described below with reference to FIGS. 2-8. In another embodiment, the link manager 150 may be implemented in microcode. In another embodiment, the link manager 150 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The client 132 includes a browser 134. The browser 134 downloads the user interface page 154, interprets the control tags and data in the user interface page 154, and executes or interprets a script 156 residing within the user interface page 154. The browser 134 and the script 156 may include instructions or statements capable of being executed on an unillustrated processor, analogous to the processor 101, or interpreted by instructions executing on the unillustrated processor in the client 132, in order to perform the functions as further described below with reference to FIGS. 2-8. In an embodiment, the script 156 is implemented via JavaScript, but in other embodiments, the script 156 may be implemented via an applet, an XML (Extensible Markup Language) document, or any other appropriate language or protocol. The user interface page 154 may be implemented via HTML (Hypertext Markup Language), XML, or any other appropriate markup language. The client 132 may also include any or all of the hardware and/or software elements previously described above for the computer system 100.

Although the browser 134, the link manager 150, the link database 152, the user interface page 154, and the script 156 are illustrated as being separate elements, in other embodiments the functions of some or all of them may be combined. For example, in an embodiment, some or all of the browser 134, the user interface page 154, and the script 156 are not present or not used, and their functions are performed by the link manager 150. Link manager 150 may also interact directly with browser 134, or files used by the browser (e.g., bookmark files, or other types of user defined menu entities).

It should be understood that FIG. 1 is intended to depict the representative major components of the computer system 100, the network 130, and the client 132 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100 and/or the client 132, cause the computer system 100 and/or the client 132 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 and/or the client 132 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
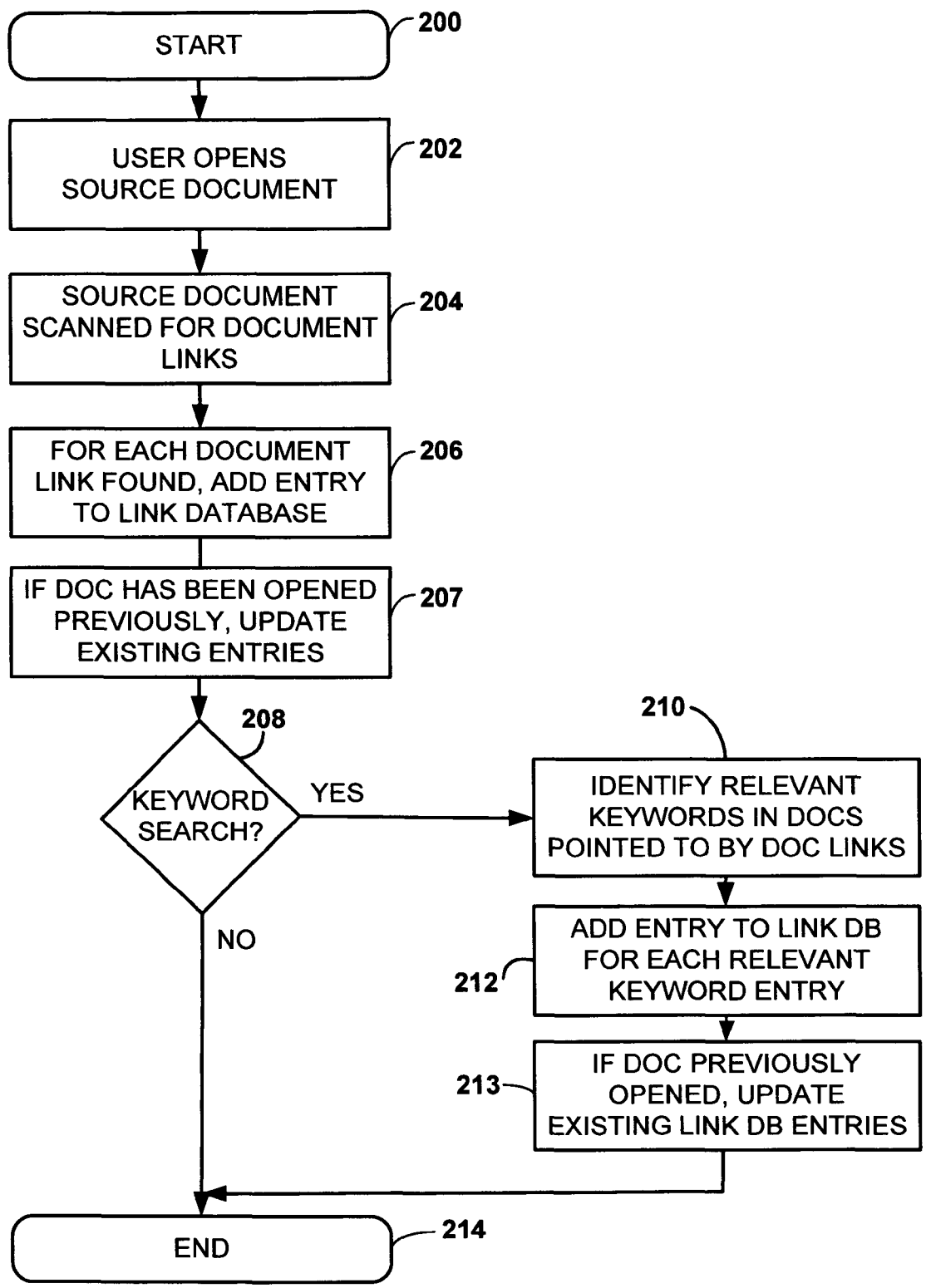
FIG. 2 illustrates a flow diagram of a method for creating and maintaining links between historical documents, in accordance with the present invention.

FIG. 2 illustrates a flow diagram of a method for creating and maintaining links between historical documents, in accordance with the present invention. It is contemplated that the following method is automatically executed upon opening a source document (e.g., by navigating to a web page via a browser). However, the method may, in alternative embodiments, be manually initiated by the user via a user control option. The method begins at block 200. At block 202, a source document is opened. Next, at block 204, the source document is scanned for document links. At block 206, for each document link found in the source document, an entry is added to the link database 152 indicating the name of the source document and the document link. If the same source document has been opened previously, the existing link database entries are updated to reflect any changes in the link structure and organization since the last time the source document was opened, as shown at block 207.

At block 208, it is determined if a search for relevant keywords should be performed on the documents pointed to by the document links. In one embodiment, this is a user selectable option within the web browser. If not, control passes to block 214. If so, control passes to block 210 where the relevant keywords are identified in the documents pointed to by the document links (i.e. destination documents). An entry is then added to the link database 152 for each relevant keyword entry, the entry comprising the keyword, a source document name and the document link of the destination document containing the relevant keyword, as shown at block 212. If the same destination document has been opened previously, the existing link database entries are updated to reflect any changes since the last time the document was opened, as shown at block 213. The method ends at block 214.

Figure 3:
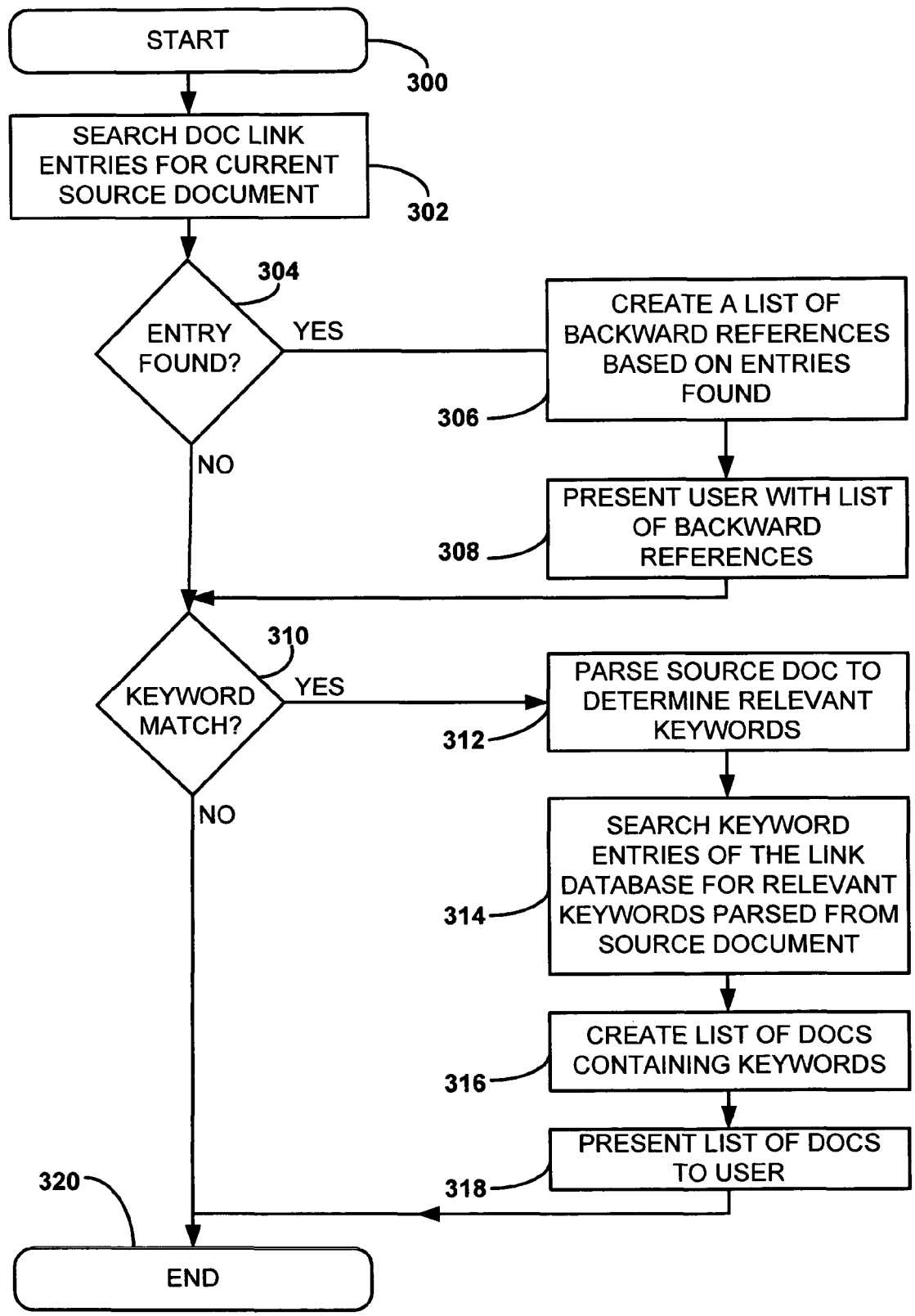
FIG. 3 illustrates a flow diagram for extracting and presenting useful information from the link database to the user, in accordance with the present invention.

FIG. 3 illustrates a flow diagram for extracting useful information from the link database 152. It is contemplated that the following method is automatically executed upon opening a source document (e.g., by navigating to a web page via a browser). However, the method may, in alternative embodiments, be manually initiated by the user via a user control option. The method begins at block 300. At block 302, the method searches the document link entries within the link database for any occurrences of the current source document. At block 304, it is determined if any of the links from the current source document are found in the document link entries. If not, control passes to block 310. If one or more links are found, a list of backward references is created which includes each entry found, as shown at block 306. At block 308, the user is presented with the list of backward references, typically via a temporary bookmark folder or via a split screen view. Other methods of presenting the list of backward references to the user are contemplated, and fall within the scope and spirit of the present invention.

At block 310, it is determined if the user wishes to create a list of documents containing keywords matching the relevant keywords parsed from the source document. In one embodiment, this is a user selectable option within the web browser. If not, control passes to block 320. If so, the current source document is parsed in order to determine relevant keywords, as shown at block 312. At block 314, the keyword entries of the link database 152 are searched for any occurrences of the relevant keywords parsed from the source document. At block 316, a list of documents containing keywords matching the relevant keywords are parsed from the source document. At block 318, the user is presented with the list of documents containing keywords matching the relevant keywords parsed from the source document, typically via a temporary bookmark folder or via a split screen view. Other methods of presenting the list of documents containing keywords matching the relevant keywords parsed by the source document are contemplated, and fall within the scope and spirit of the present invention. The method ends at block 320.

The method of FIG. 3 is fully compatible with the method of FIG. 2, and the two methods can be practiced concurrently or non-concurrently. For example, when a user navigates to a new source document, the method of FIG. 2 analyzes the document in order to add any document links to the link database. The method of FIG. 3 analyzes the document links on the source document to see if a backward reference list and/or a list of documents containing keywords matching the relevant keywords parsed from the source document should be built and displayed for the user.

Figure 4:
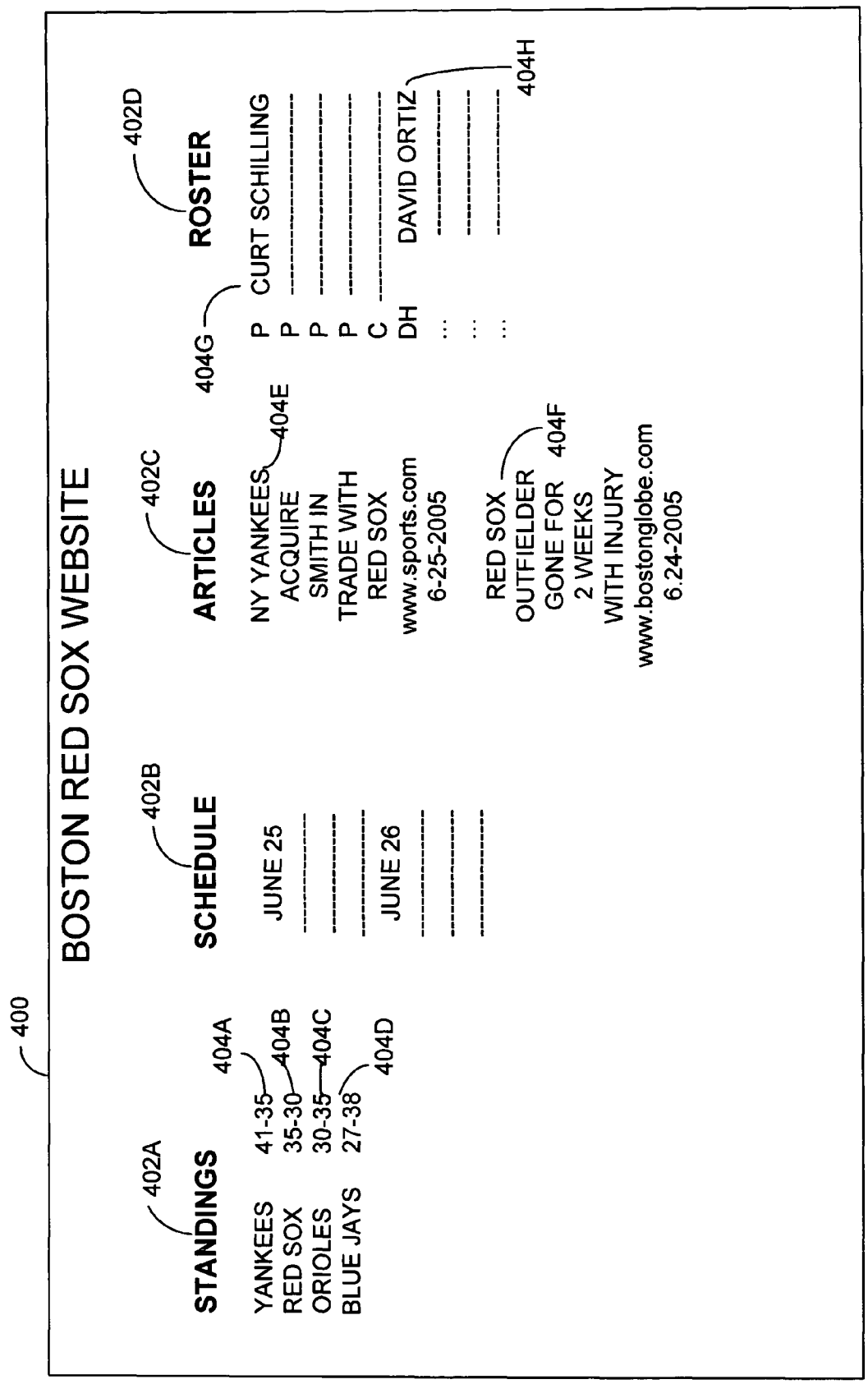
FIG. 4 illustrates an example of a document upon which the present invention operates.

FIG. 4 an exemplary example of a source document upon which the present invention operates, shown generally at 400. Documents, in the context of the present invention include, but are not limited to: word processor documents, Portable Desktop Format (PDF) file, e-mails, websites, instant messages and electronic notes. The example document 400 is a website for the Boston RED SOX major league baseball team, displayed within browser 134. This document 400 is organized by several headings 402A-402D, each heading including one or more Uniform Reference Locator (URL) links 404A-404H to other websites (i.e., destination documents). The headings 402 organize the source document 400 into various areas of fan interest (e.g., standings, schedule, articles, roster, etc.).

In one embodiment of the present invention, when source document 400 is opened by browser 134, the source document is first scanned for appropriate document links by link manager 150. In this instance, there are several document links (URLs) 404A-404H present within the source document 400. For each document link (URL) 404A-404H found in the source document 400, link manager 150 adds an entry to link database 152 indicating the name of the source document (e.g., the URL for the current source document) and the URL of the destination document. Link database 152 is described in more detail in FIG. 5. In an alternative embodiment, the scan operation may be manually initiated by the user, rather than automatically initiated by the link manager 150.

In one embodiment of the present invention, the destination documents pointed to by document links (URLs) may be scanned for relevant keywords. One potential way to automatically determine relevant keywords within destination documents is to examine the destination documents for words or terms that are repeatedly used. If a word or phrase is repeatedly used within the destination document, it can then be identified as a relevant keyword. Another technique to determine relevant keywords is to examine the font size and/or bolding of text within the destination document. Words that appear in a relatively larger typeface or font size, or that exist within bold text can be also identified as relevant keywords. Several other methods for the identification of a set of relevant keywords within the destination document can be practiced, and still remain within the spirit and scope of the present invention. Once the relevant keywords have been determined, an entry containing the keyword, the destination document and the associated source document is added to the link database 152. This is more fully described in FIG. 5.

Figure 5:
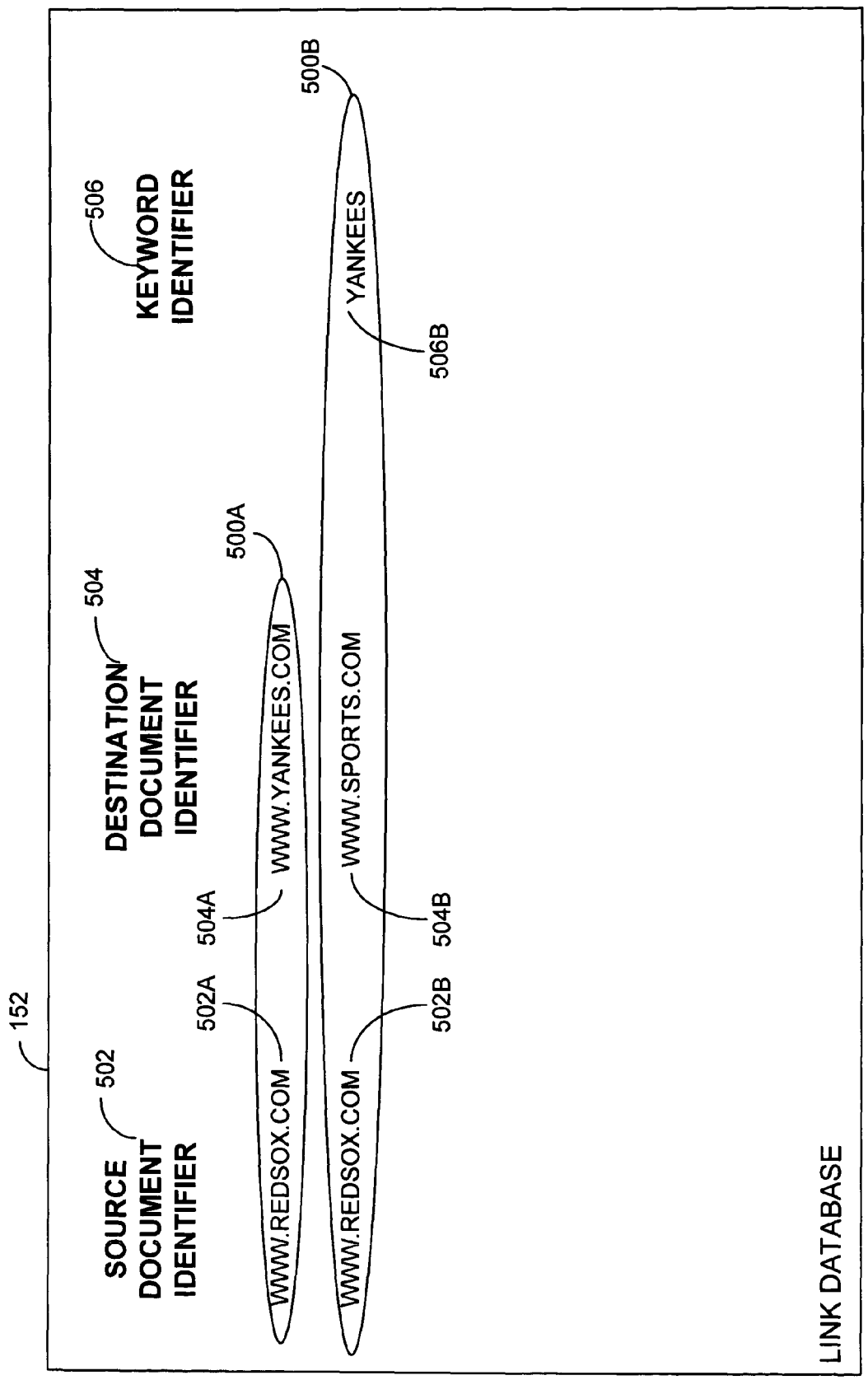
FIG. 5 illustrates one embodiment of a link database in accordance with the present invention.

FIG. 5 illustrates one embodiment of the link database 152 in accordance with the present invention. Each entry 500 (e.g., entry 500A, 500B, etc.) within the link database includes a source document identifier 502, a destination document identifier 504, and optionally, a keyword identifier 506. Entries 500 are written to link database 152 when a source document is parsed by link manager 150, as previously described in FIG. 2. If entries already exist within link database 152 for an already parsed source document, link manager 150 updates the entries 500 upon subsequent accesses of the source document.

By way of example, referring back to FIG. 4, URL 404A from the source document (e.g., the Boston RED SOX Website, www.REDSOX.com) points to another website www.YANKEES.com which contains an article about the New York YANKEES. When link manager 150 parses the Boston Red Sox website (i.e., the source document), it will add an entry 500A to the link database 152 as shown in FIG. 3, listing www.REDSOX.com as the source document identifier 502, and www.YANKEES.com as the destination document identifier 504.

Link manager 150 may also parse the destination documents for relevant keywords to include in the link database 152, as previously described. FIG. 6 illustrates the destination document 602 pointed to by URL 404E from the source document (e.g., the Boston RED SOX website previously illustrated in FIG. 4) entitled "New York YANKEES Acquire Smith in Trade with RED SOX"). As described previously, one method of identifying relevant keywords within a document is to determine the frequency of occurrence of words in the destination document. In the illustrated example, link manager 150 determines that the word "YANKEES" repeatedly occurs within the destination document 602 (indicated by bold text), thus an entry 500B is added to the link database 152, as shown in FIG. 5, listing www.REDSOX.com as the source document identifier 502, www.sports.com as the destination document identifier 504, and "YANKEES" as the keyword identifier 506.

Once the link database 152 has entries, when a new source document is opened, the link manager 150 searches the destination document identifier 504 field within the link database 152 for the presence of the current source document. This is done in order to find any documents that reference the currently opened source document. In other words, backward references to the current document are identified (i.e., the source document identifier 502 field), including only documents which the user has previously visited. Link manager 150 creates a list of such backward references, and presents this list of backward references to the user. Various mechanisms may be employed for presenting the list of backward references to the user, including, but not limited to the use of a temporary bookmark folder within the browser 134, and a user-activated split screen view.

By way of example, assume that the user has visited the Boston RED SOX website previously illustrated in FIG. 4, and that some entries 500 have been created in the link database 152 from this website, as shown in FIG. 5. Assume that the user visits the www.YANKEES.com website about a week later. When the user navigates to the www.YANKEES.com website, the link manager 150 searches the destination document identifier 504 field in the link database 152 for the presence of www.YANKEES.com (i.e., the current source document). In this case, entry 500A has www.YANKEES.com in the destination document identifier 504 field, so the source document identifier 502 field value (i.e., www.REDSOX.com) is added to a list of backward reference documents, which is then presented to the user.

In one embodiment of the present invention, when the link database 152 has keyword entries, when a new source document is opened, the link manager 150 parses the current source document for relevant keywords (using methods previously described for keyword searching in destination documents). Link manager 150 then searches the destination document keyword 506 field in the link database 152 for any occurrences of the relevant keywords parsed from the current source document. If any such keywords are found, a list of documents containing keywords matching the relevant keywords parsed from the source document is created. This list of documents is gathered from the source document identifier 502 field of the link database. This list of documents is then presented to the user. Various mechanisms may be employed for presenting the list of backward references to the user, including, but not limited to the use of a temporary bookmark folder within the browser 134, and a user-activated split screen view.

Suppose that a user visits the sports.com website, www.sports.com, shown by way of illustrative example in FIG. 6. The home webpage of the www.sports.com website is parsed for relevant keywords. It is determined that the word "YANKEES" is a relevant keyword on the current web page, since it has a relatively high frequency of occurrence. The link manager 150 then searches for the relevant keyword "YANKEES" in the destination document keyword 506 field in the link database 152 for any occurrences of the keyword "YANKEES". An entry 500B has the keyword YANKEES in the destination document keyword 506 field, so the corresponding source document identifier 502 field value (i.e., www.REDSOX.com) is added to a list of matching keyword references, which is then presented to the user.

Figure 7:
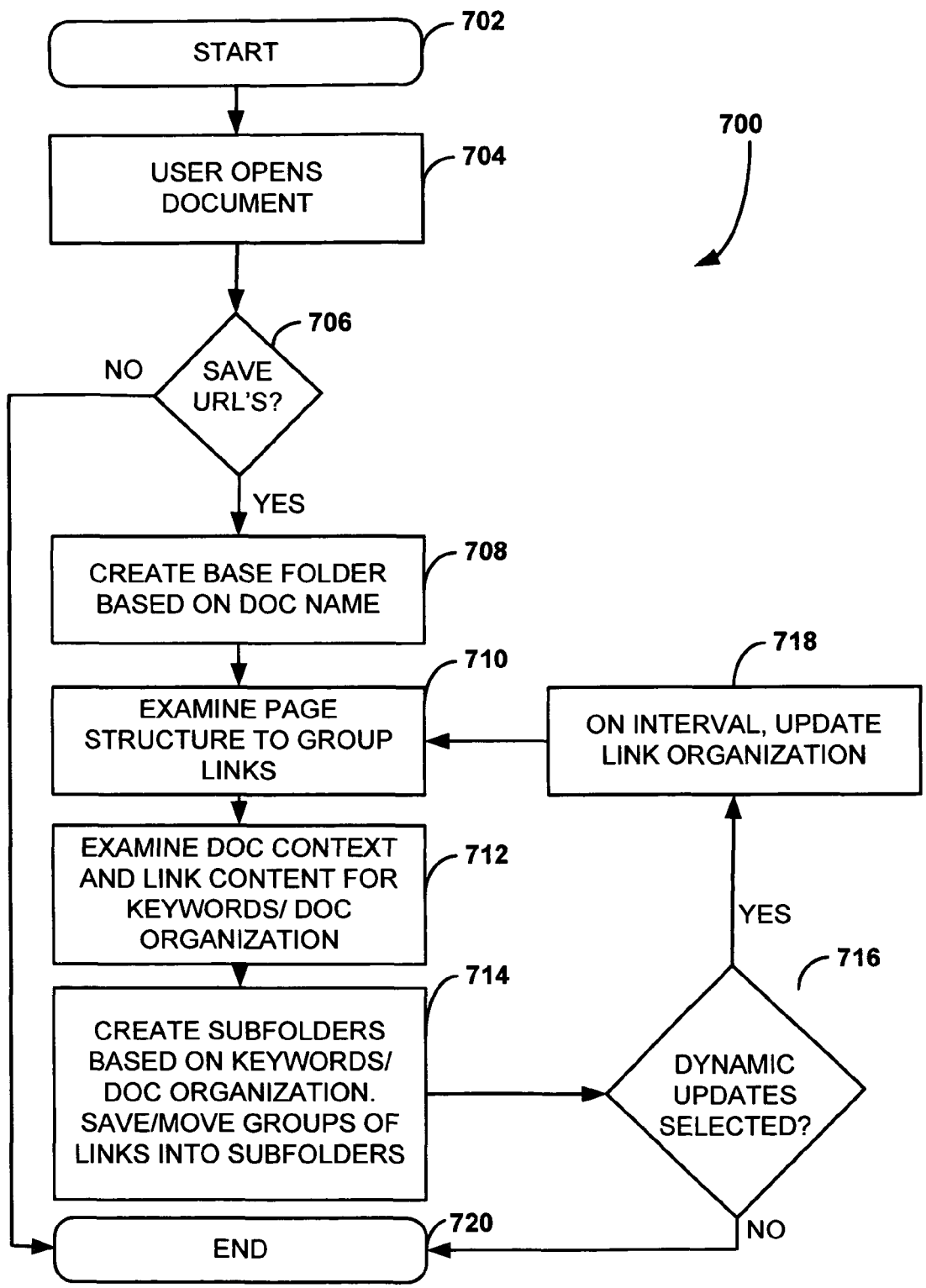
FIG. 7 is a flow diagram of a method to organize and hierarchically bookmark multiple links (URLs) to various websites within a given document in accordance with the present invention.

In another aspect of the present invention, when a source document is opened containing multiple links (URLs) to various websites, these links within the source document can be organized and bookmarked hierarchically, by an exemplary method illustrated in FIG. 7. This method starts at block 702.

At block 704, a user opens a document containing multiple links (URL's) to various websites. This process can be initialized explicitly by the user (e.g., by answering a prompt such as "Save URLs as Hierarchical Bookmarks", shown at block 706) or alternatively, automatically by the system (not shown). If the user chooses not to save the links (URLs) as hierarchical bookmarks the process ends at block 720. Otherwise, at block 708, a base bookmark folder is created, the naming for the folder based on the originating document name, or alternatively from the most relevant keywords from the document.

Next, at block 710, the structure of the document is analyzed in order to determine a logical grouping for the links (URL's) present within the source document into subcategories. This analysis can look at various structural aspects of the source document, including, but not limited to: headings, table of contents, lists, sections, paragraphs and/or references in order to group the links (URL's). To enhance the organization and grouping of the links (URL's) (or if no logical groupings could be found based on page structure), the content of the links and surrounding context are analyzed to parse the main keywords associated with each resource, and organize the links based on similar keywords, as shown at block 712. Multiple subcategorization schemes (i.e., groupings) may then be optionally presented to the user, thus enabling the user to choose the subcategorization scheme that best meets their needs. Keywords from the document context surrounding a grouping of links, and from the content within the link itself, is parsed to determine folder names for each logical grouping.

At block 714, subfolders are created based on the keywords from block 712, and the appropriate links are placed within each subfolder. In one embodiment of the present invention, an option exists that enables the user to specify whether or not the organization and grouping of links change as the context surrounding the links (and the content of the links themselves) are updated, as shown at block 716. If a user does not wish dynamic updates, the method ends at block 720. If a user affirmatively selects the dynamic update option, the link organization is periodically updated, as shown at block 718). In one embodiment, the changed links can be displayed to the user in the bookmark folders via "ghost links", or alternatively by faded placemarks where the link used to reside which take the user to the new location of the link.

Figure 8:
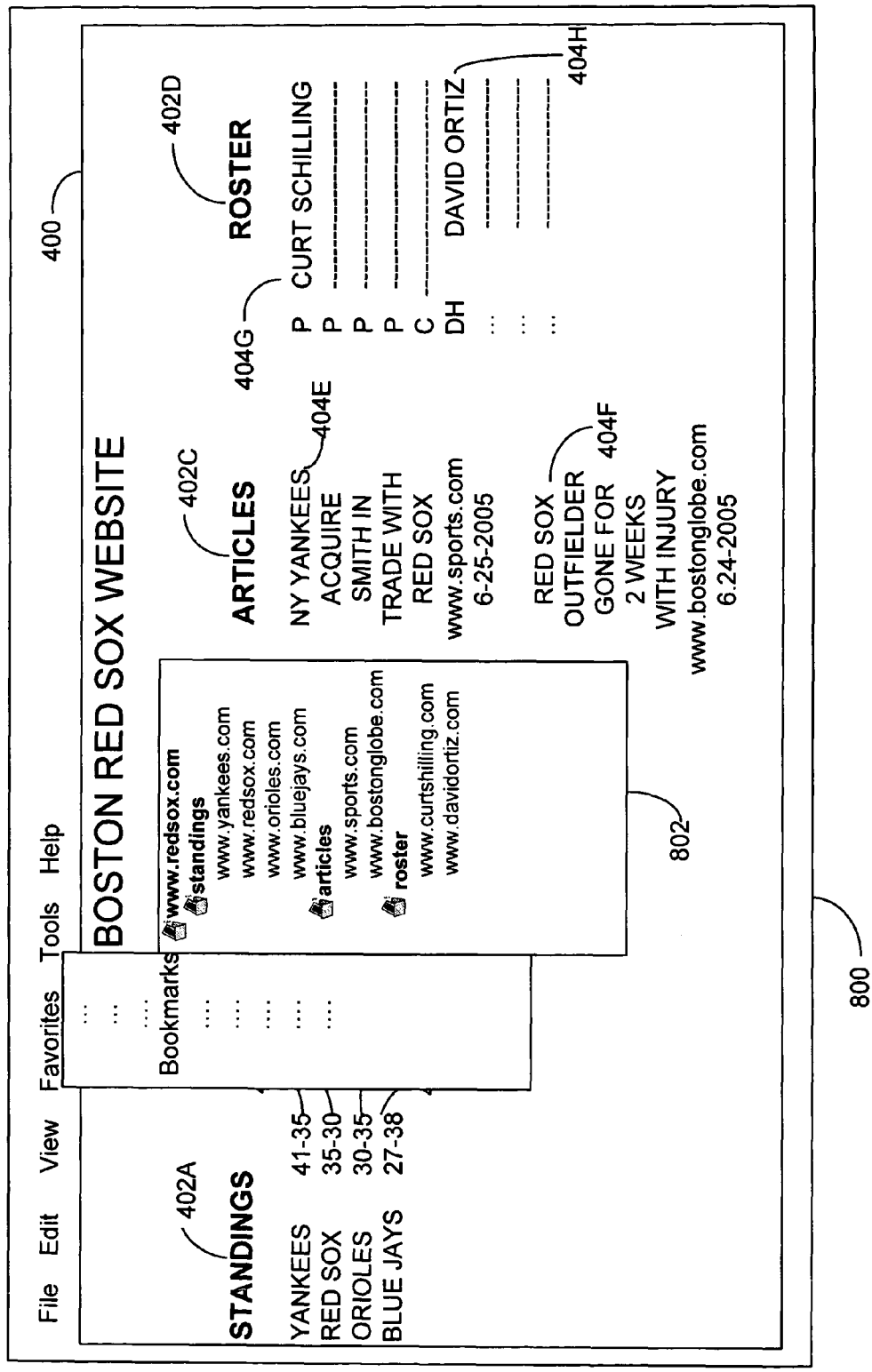
FIG. 8 illustrates the source document of FIG. 4, wherein the links within the source document are organized and bookmarked hierarchically, in accordance with the present invention.

FIG. 8 illustrates the source document of FIG. 4, wherein the links within the source document are organized and bookmarked hierarchically, shown generally at 800. In the illustrated example, a user navigates to the "Boston RED SOX" Website via a web browser. The illustrated website contains a number of links (URL's) 404A-404H which point to various other websites. The user is then prompted whether they desire to have the URL's from the page to be saved as hierarchical bookmarks. Alternatively, the bookmarks may be automatically saved or not saved, via a browser control option.

If the user wishes to save the URLs from the current document as historical bookmarks, a base bookmark folder for the current document is created. The name for the base bookmark folder for the current document can be derived in a number of ways. In the illustrated embodiment, the base bookmark folder is named based on the originating document name "REDSOX.com". In an alternate embodiment, the name for the base bookmark folder can be derived from relevant keywords within the document.

Next, the structure of the current document (e.g., the Boston RED SOX webpage) is analyzed in order to determine a logical grouping for the links (URL's) present within the current document. In the illustrated embodiment, the website is divided into several headings (e.g., "Standings" 402A, "Schedule" 402B, "Articles" 402C and "Roster" 402D). These headings provide an excellent way to categorize the links (URL's) within the page. By analyzing the HyperText Markup Language (HTML) for the webpage, the relationship between the URL's and their corresponding headings may be determined. For example, the URLs: www.YANKEES.com 404A, www.REDSOX.com 404B, www.ORIOLES.com 404C and www.BLUEJAYS.com 404D are grouped under the "Standings" heading. The URL's pointing to articles on the Boston RED SOX webpage, i.e., www.sports.com 404E and www.bostonglobe.com 404F are grouped under the "Articles" heading. Finally, the URL's pointing to player's websites under the "Roster" heading, i.e., www.curtshilling.com 404G and www.davidortiz.com 404H are grouped under the "Roster" heading.

In other embodiments of the present invention, other structural aspects of the source document (e.g., headings, tables of contents, lists, sections, paragraphs) may be analyzed in order to group the URL's within the document. In one such embodiment, the user is presented with multiple potential grouping schemes for the keywords based on different types of structural groupings, and the user may choose the scheme which best reflects their needs.

Next, a subfolder is created under the base bookmark folder for each of the headings, and the links corresponding to each heading are moved into the corresponding subfolder, then displayed to the user as a browser option, as shown at 802. In this way, the URL's that exist within this document (e.g., webpage) are organized in a hierarchical fashion, and are available for future reference. In the illustrative example, only one level of subfolders is created, corresponding to the headings within the source document. It is noted that further hierarchical levels of subfolders could be created, and still remain within the scope and spirit of the present invention. For example, under the heading "Standings", their may be subheadings "American League" and "National League". These subheadings may be used to create corresponding subfolders under the "Standings" subfolder.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method for managing links within a plurality of documents, the method comprising the steps of:
    interactively opening a source document chosen by a user from the plurality of documents residing on a physical storage device on a computer system;
    scanning the source document for document links;
    for each document link found in the source document:
        adding an entry to a link database indicating the name of the source document and the document link;
        scanning a textual portion of a destination document pointed to by the document link for any relevant keywords, the relevant keywords determined by at least one of: a frequency of occurrence of words within the textual portion of destination document, a font size of words within the textual portion of the destination document, and a typeface of words within the textual portion destination document;
        adding the relevant keywords to the link database via a keyword entry, the keyword entry including the relevant keyword, a destination document name and the document link of the destination document containing the relevant keyword; and
    organizing the document links in a hierarchical manner based on a structure of the source document, comprising:
        creating a base bookmark folder;
        analyzing the structure of the source document in order to determine a logical grouping of the document links;
        creating a plurality of link subcategories based on the logical grouping of the document links;
        parsing the source document content and link content for other relevant keywords;
        creating bookmark subfolders to the base bookmark folder based on the plurality of link subcategories, wherein the name for each bookmark subfolder is based upon the other relevant keywords; and
        updating dynamically the organization and grouping of link subcategories and associated bookmark folders and subfolders based upon changes to a context surrounding the document links and the content of the document links themselves.

2. The method of claim 1, wherein the source documents are chosen from the group consisting of: word processor documents, Portable Desktop Format (PDF) files, e-mails, websites, and electronic notes.

3. The method of claim 1, wherein the document links are Uniform Reference Locators (URL's).

4. The method of claim 1, wherein the step of creating bookmark subfolders to the base bookmark folder based on the plurality of link subcategories, wherein the name for each bookmark subfolder is based upon the other relevant keywords further comprises:
    presenting a plurality of subcharacterization schemes to the user, wherein the user chooses one of the plurality of subcategorization schemes that best meets the user's needs.

5. The method of claim 1, wherein the changed links are displayed to tile user in the updated bookmark subfolders via ghost links.

6. The method of claim 1, wherein removed links are displayed to the user by faded placemarks where the link used to reside which take the user to a new location of the link.

* * * * *